(12) United States Patent
Shibata et al.

(10) Patent No.: US 6,343,744 B1
(45) Date of Patent: Feb. 5, 2002

(54) NONCONTACT TYPE IC CARD AND SYSTEM THEREFOR

(75) Inventors: Tsugumichi Shibata; Tadao Takeda; Toshinori Fukunaga; Tomota Ieyasu, all of Kawagawa (JP)

(73) Assignee: Nippon Telegraph and Telephone Corporation (JP)

( * ) Notice: Subject to any disclaimer, the term of this patent is extended or adjusted under 35 U.S.C. 154(b) by 0 days.

(21) Appl. No.: 09/507,298

(22) Filed: Feb. 18, 2000

(30) Foreign Application Priority Data

Feb. 19, 1999 (JP) .......................................... 11-042013

(51) Int. Cl.⁷ .............................................. G06K 19/06
(52) U.S. Cl. ...................... 235/492; 235/380; 235/441; 235/487
(58) Field of Search ................................ 235/380, 492, 235/441

(56) References Cited

U.S. PATENT DOCUMENTS

| | | | |
|---|---|---|---|
| 4,780,604 A | * 10/1988 | Hasegawa et al. | .......... 235/492 |
| 5,313,211 A | 5/1994 | Tokuda et al. | |
| 5,698,838 A | * 12/1997 | Yamaguchi | .................. 235/492 |
| 5,801,372 A | * 9/1998 | Yamaguchi | .................. 235/492 |
| 6,073,856 A | * 6/2000 | Takahashi | .................... 235/492 |

FOREIGN PATENT DOCUMENTS

JP   KOKAI 4-190480   7/1992

* cited by examiner

*Primary Examiner*—Harold I. Pitts
(74) *Attorney, Agent, or Firm*—Blakely Sokoloff Taylor & Zafman

(57) ABSTRACT

A noncontact type IC card includes an electromagnetic induction coil, integrated circuit, and switch. The electromagnetic induction coil receives the energy of an electromagnetic field radiated from an external device. The integrated circuit can be operated by driving power supplied by the energy of the electromagnetic field. The switch is provided on the electromagnetic induction coil for receiving the energy of the electromagnetic field and switches the inductance of the electromagnetic induction coil.

20 Claims, 16 Drawing Sheets

HARD/SOFT SWITCH CHARACTERISTICS

| | HARD SWITCH | SOFT SWITCH |
|---|---|---|
| POWER SUPPLY | ○ UNNECESSARY FOR SWITCH OPERATION | ▲ NECESSARY |
| OPERABILITY | ○ SWITCH CAN BE UNCONSCIOUSLY USED (E.G. FOLDER) | ▲ INTENTIONAL SWITCH OPERATION IS NECESSARY |
| | ○ SIMPLE | ▲ CUMBERSOME |
| TEMPER RESISTANCE | ○ OPERATION INHIBITION IS SET BY PHYSICAL LAYER | ▲ OPERATION INHIBITION IS SET BY UPPER LAYER |
| STRUCTURE | ○ SIMPLE | ▲ COMPLEX |
| COST | ○ LOW | ▲ HIGH |

FIG. 3

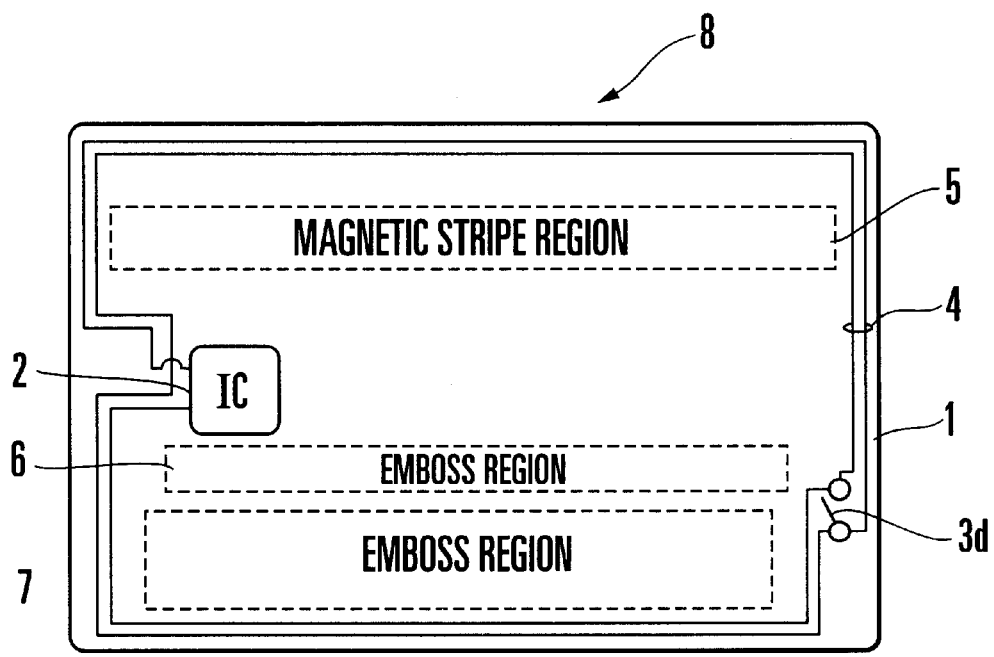
FIG. 11
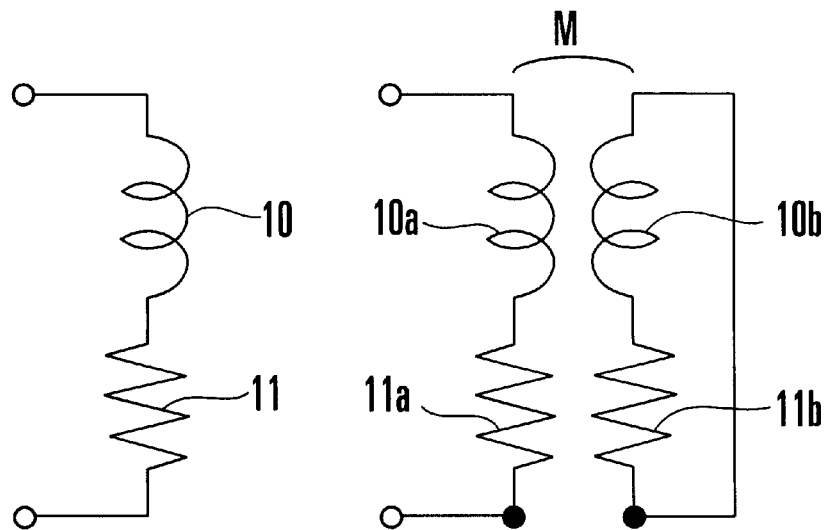
SWITCH OFF
FIG. 12A
SWITCH ON
FIG. 12B

SECTION TAKEN ALONG LINE B – B'

SECTION TAKEN ALONG LINE C – C'

CARD USABLE STATE

CARD USE INHIBITED STATE

| SWITCH | SELF-INDUCTANCE | RESONANCE FREQUENCY (C = 76.5pF) |
|---|---|---|
| OFF | 1.8 $\mu$H | 13.56MHz |
| ON | 0.16 $\mu$H | 45.5MHz |

| SWITCH | EXTERNAL TERMINAL | CARD FOLDER |
|---|---|---|
| OFF | COMMUNICABLE | NONCOMMUNICABLE |
| ON | NONCOMMUNICABLE | COMMUNICABLE |

NONCONTACT TYPE IC CARD AND SYSTEM THEREFOR

BACKGROUND OF THE INVENTION

The present invention relates to a noncontact type IC card and a system therefor and, more particularly, to a system which performs power supply or data communication using electromagnetic induction or an electromagnetic wave. The present invention is used as, e.g., a data carrier, tag, license, identification, electronic money, memory card, prepaid card, telephone card, or the like.

Conventionally available IC cards are classified into a contact type and noncontact type in accordance with the form of the physical interface serving as a communication means to the device (e.g., a read/write device, or questioner and interrogator; to be referred to as a read/write device hereinafter) of the other party of communication.

In a contact type IC card, power supply or data signal transmission to the card is done through an electrical contact. The card becomes operative for the first time when it is inserted into the slot of a read/write device to connect the contacts. Hence, unless the user consciously inserts the card into the slot, the card does not operate. The card is not unconsciously operated.

On the other hand, the mainstream of noncontact type IC cards receives power necessary for the operation of the mounted IC from a read/write device using electromagnetic induction or an electromagnetic wave. If an IC card is moved close to the read/write device during the operation of the read/write device, the IC card may obtain power by electromagnetic induction, automatically actuate the circuit and then start operation. If the cardholder unintentionally moves the card close to the read/write device, data is unconsciously transmitted between the read/write device and the card. This may pose the problem of information leakage or invalid transactions. To solve this problem, in the conventional noncontact type IC card system, generally, a protection means is employed as software or from the viewpoint of operation form for the entire system.

However, for a read/write device manufactured for the purpose of illicit information read, it is impossible to prevent illicitness unless an advanced technical means such as cryptology is used. Hence, cardholders must always take such situation into consideration. Additionally, as IC cards become popular, various read/write devices having the same carrier frequency but different output powers or application purposes are expected to be used. That is, since one person will hold cards of a plurality of systems, interference between systems of different types and operation errors may pose serious problems.

SUMMARY OF THE INVENTION

The present invention has been made to solve the above problems, and has as its object to provide a noncontact type IC card which prevents any information leakage, invalid transactions, undesired interference between systems of different types, and operation errors, and a system for the card.

In order to achieve the above object, according to the present invention, there is provided a noncontact type IC card comprising means for receiving an energy of an electromagnetic field radiated from an external device, an integrated circuit which can be operated by driving power supplied by the energy of the electromagnetic field, and a switch provided on the means for receiving the energy of the electromagnetic field to switch an inductance of the means.

BRIEF DESCRIPTION OF THE DRAWINGS

FIG. 3 is a table showing the characteristics of a hard switch and soft switch;

FIG. 11 is a plan view showing the fourth embodiment of the present invention;

FIG. 12A is a circuit diagram showing an equivalent circuit in the switch OFF state in the fourth embodiment;

FIG. 12B is a circuit diagram showing an equivalent circuit in the switch ON state in the fourth embodiment;

DESCRIPTION OF THE PREFERRED EMBODIMENTS

The embodiments of the present invention will be described next with reference to the accompanying drawings.

[First Embodiment]

Figure 1:
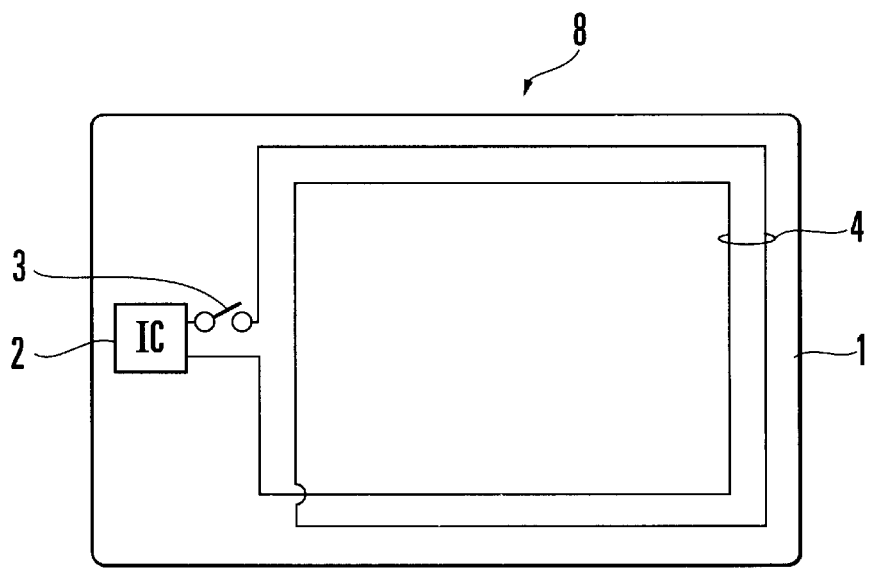
FIG. 1 is a plan view showing the first embodiment of the present invention.

FIG. 1 shows the first embodiment of the present invention. As shown in FIG. 1, an IC card 8 comprises a substrate 1, IC 2, switch 3, and electromagnetic induction coil 4. One terminal of the electromagnetic induction coil 4 formed on the surface of the substrate 1 as a card base material is directly connected to a predetermined terminal of the IC 2. The other terminal of the electromagnetic induction coil 4 is connected to another predetermined terminal of the IC 2 through the switch 3. When the switch 3 is ON, the IC card 8 normally operates. When the switch 3 is turned off, the operation of the IC card 8 can be inhibited.

As the characteristic feature of the arrangement of this embodiment, when the switch 3 is turned off to inhibit the operation of the IC card 8, and in this state, the IC card 8 is moved close to a read/write device, interference to the read/write device side can be minimized because no current flows through the electromagnetic induction coil 4. As a consequence, even when another card different from this IC card 8 is moved close to the same read/write device and performs communication, the probability of disturbance in the operations of these cards can be minimized.

Figure 2:
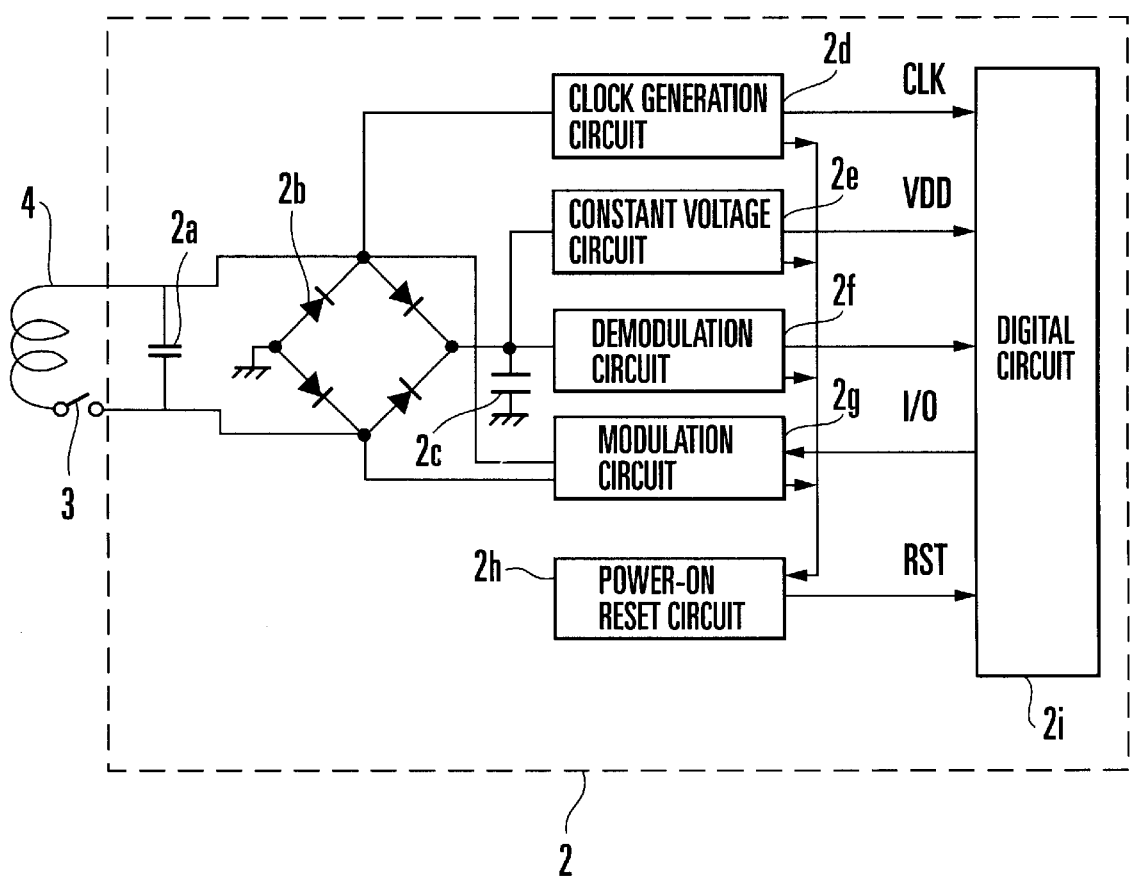
FIG. 2 is a circuit diagram showing the first embodiment.

FIG. 2 shows the IC card 8. As shown in FIG. 2, the IC 2 has a resonance capacitor 2a, full-wave rectification circuit 2b, smoothing capacitor 2c, clock generation circuit 2d, constant voltage circuit 2e, demodulation circuit 2f, modulation circuit 2g, power-on reset circuit 2h, and digital circuit 2i. The digital circuit 2i has a ROM, RAM, or nonvolatile memory in addition to a CPU, and further includes a co-processor, clock generator, initial response protocol control circuit, interface circuit for asynchronous communication with an analog section, and the like, as needed. When an electromagnetic field radiated from the external read/write device is tuned by the resonance capacitor 2a, a voltage is induced by the antenna 4. The voltage induced by the antenna 4 is rectified by the full-wave rectification circuit 2b, smoothed by the smoothing capacitor 2c, and supplied to the constant voltage circuit 2e or demodulation circuit 2f. The constant voltage circuit 2e generates a predetermined voltage VDD and supplies it to the digital circuit 2i. The demodulation circuit 2f demodulates a received signal and supplies it to the digital circuit 2i. The clock generation circuit 2d generates a clock CLK from the voltage induced by the antenna 4 and supplies the clock CLK to the digital circuit 2i. The power-on reset circuit 2h monitors the clock generated by the clock generation circuit 2d, the constant voltage output from the constant voltage circuit 2e, and the outputs from the demodulation circuit 2f and modulation circuit 2g. The power-on reset circuit 2h determines on the basis of the monitor result whether sufficient power for the operation of the digital circuit 2i is supplied, and sends a reset signal for the start of driving to the digital circuit 2i. The digital circuit 2i is driven in synchronism with the clock CLK and operated on the basis of the signal supplied from the demodulation circuit 2f. Hence, a signal supplied from the external read/write device is processed by the digital circuit 2i. The digital circuit 2i can also transmit a signal to the external read/write device and transmits information through the modulation circuit 2g and antenna 4.

The difference in effect between use of a conventional soft switch and use of a hard switch as a characteristic feature of the present invention will be described below.

FIG. 3 shows the difference in effect between use of a soft switch and use of a hard switch. When a soft switch is used, a power supply is necessary to maintain the switch ON/OFF state. However, a hard switch does not require such power supply. As for the operability, the soft switch requires an intentional operation of, e.g., inputting a key set in advance, resulting in cumbersomeness. However, the hard switch requires only a simple operation. As for the tamper resistance, the soft switch must set inhibition of the switch operation in the upper layer while the hard switch need only set operation inhibition in the physical layer. The hard switch is also advantageous because of its simple structure and low cost.

The switch 3 is inserted to disconnect the circuit. For this reason, a contact failure in the switch 3 may impede the normal operation of the circuit. To prevent this, an appropriate reliable switch must be used as the switch 3. The insertion position of the switch 3 is not limited to the connection point between the electromagnetic induction coil 4 and the IC 2. The same effect as described above can be expected even at an arbitrary point of the electromagnetic induction coil 4. However, the switch 3 is most preferably inserted to the connection point between the electromagnetic induction coil 4 and the IC 2, as shown in FIG. 1, because the electromagnetic induction coil 4 is often formed integrally with the substrate 1, the IC 2 is often mounted on a base (carrier) smaller than the substrate 1 and then buried in the substrate 1, and the base can also be used to mount the switch. This structure is excellent from the viewpoint of cost and reliability of the card. As the form of the switch 3, a slide type and push button type suitable for the shape of the card are available.

Figure 4:
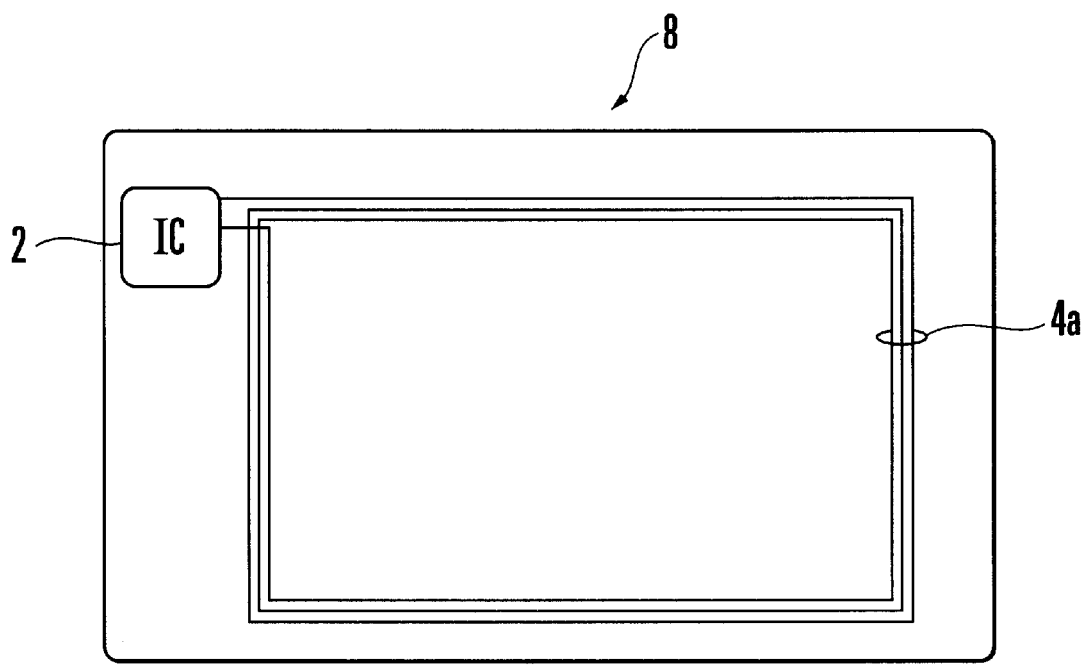
FIG. 4 is a plan view showing an IC card using an electromagnetic induction coil.
Figure 5:
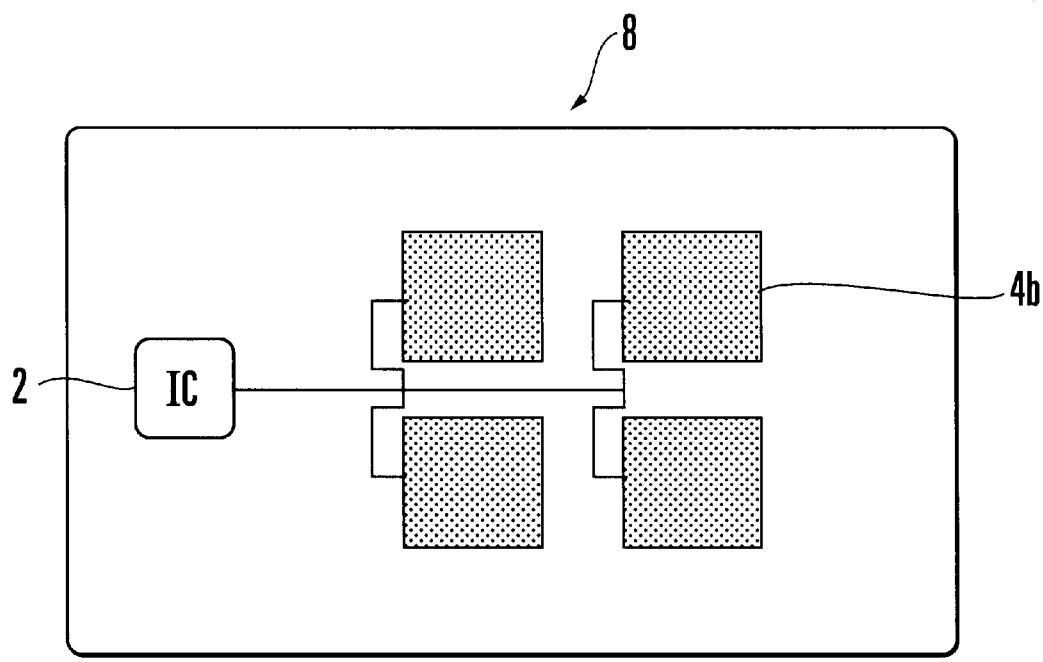
FIG. 5 is a plan view showing an IC card using a strip antenna.
Figure 6:
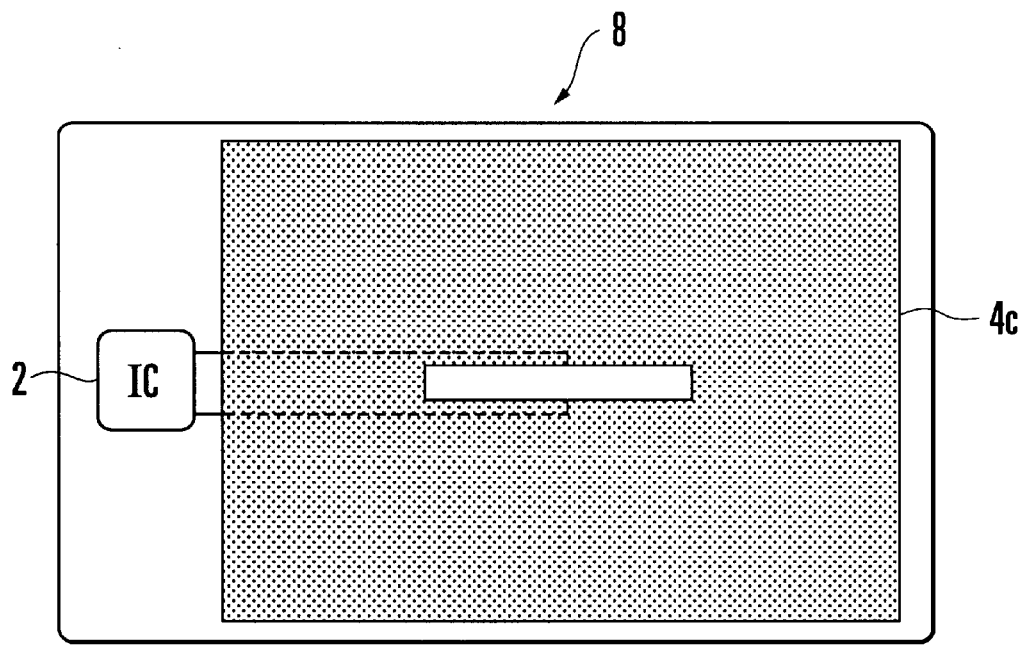
FIG. 6 is a plan view showing an IC card using a slot antenna.
Figure 7:
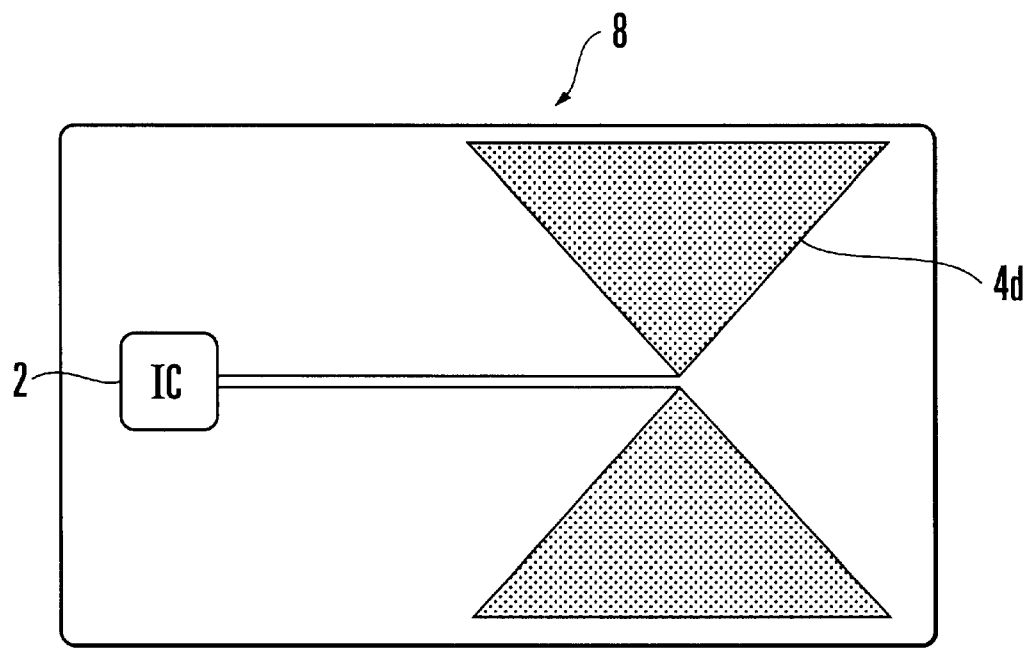
FIG. 7 is a plan view showing an IC card using a bowtie antenna.

The structure of the electromagnetic induction coil (electromagnetic induction coil 4a in FIG. 4) or antenna of this embodiment is the same as that of the conventional noncontact type IC card. For example, when a frequency LF (Low Frequency) and HF (High Frequency) is used, a conductive wire is wounded and buried in the card, or a pattern of a conductive foil is formed on the surface of a substrate as the base material of the card by printing, plating, or etching. If a frequency in the microwave band is used, a strip antenna (strip antenna 4b in FIG. 5), slot antenna (slot antenna 4c in FIG. 6), or bowtie antenna (bowtie antenna 4d in FIG. 7) is formed by plating or etching.

Figure 8:
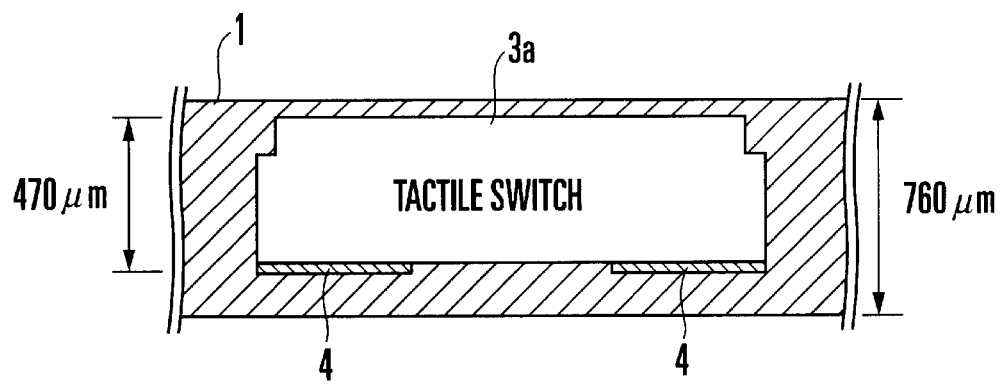
FIG. 8 is a sectional view showing a tactile switch in the IC card.

After the electromagnetic induction coil, antenna, and IC are connected such that the card functions, another card base material is bonded to encapsulate and protect the circuit, thereby completing the IC card. The movable portion of the switch must be exposed to the surface of the bonded card base material such that the switch can be operated by, e.g., a finger. When a push button type switch is used, the entire switch may be covered with a thin film-like card base material such that the switch can be operated from the upper surface of the card base material. A communication disabled state may normally be set, and a communicable state may be set only when the switch is pressed with a finger. Alternatively, the switch ON/OFF state may be switched every time the switch is pressed. As a concrete example of such a push button type switch, a tactile switch 3a available from Omron, as shown in FIG. 8, can be used. This is a very thin and lightweight switch having a size of 4.7 mm square, a thickness of 0.47 mm, and a mass of 0.01 g, and is suitable as the switch of an IC card.

[Second Embodiment]

Figure 9:
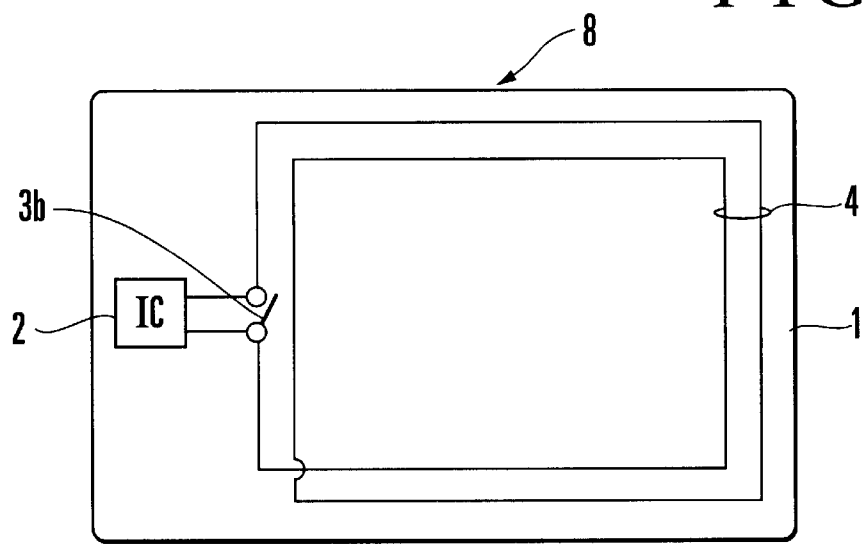
FIG. 9 is a plan view showing the second embodiment of the present invention.

FIG. 9 shows the second embodiment of the present invention. As shown in FIG. 9, the two terminals of an electromagnetic induction coil 4 formed on the surface of a substrate 1 as a card base material are directly connected to predetermined terminals of an IC 2. A switch 3a is inserted to short-circuit the two terminals that connect the electromagnetic induction coil 4 and IC 2. In the OFF state of the switch 3a, an IC card 8 normally operates. When the switch 3a is turned on, the connection points between the electromagnetic induction coil 4 and the IC 2 are short-circuited, and the operation of the IC card 8 can be inhibited. According to this arrangement, the normal operation is performed in the OFF state of the switch 3a. Hence, even when the switch 3a has a contact failure, the normal operation is not impeded. Contact failures account for the greater part of failure modes.

When the switch 3a is turned on to inhibit the card operation, and the card is moved close to a read/write device, a current flows to the electromagnetic induction coil 4 through the short circuit path by the switch 3a. For this reason, when another card different from the IC card 8 is moved close to the same read/write device and performs communication, slight disturbance may occur in the operations of these cards. However, it is possible to design the card not to pose any problem in the operation or function of another card.

[Third Embodiment]

Figure 10:
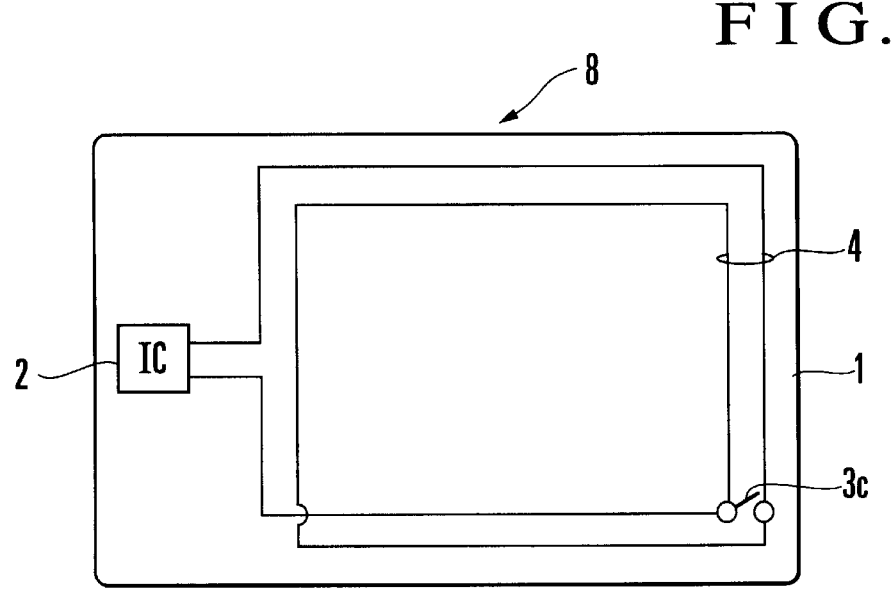
FIG. 10 is a plan view showing the third embodiment of the present invention.

FIG. 10 shows the third embodiment of the present invention. As shown in FIG. 10, the two terminals of an electromagnetic induction coil 4 formed on the surface of a substrate 1 as a card base material are connected to predetermined terminals of an IC 2. A switch 3b is connected to short-circuit two points in the middle of the conductive pattern of the electromagnetic induction coil 4. When the switch 3b is OFF, an IC card 8 normally operates. When the switch 3b is ON, the inductance of the electromagnetic induction coil 4 largely changes from the value in the normal operation mode, and necessary power is not supplied, i.e., the card operation is inhibited.

[Fourth Embodiment]

FIG. 11 shows the fourth embodiment of the present invention. This embodiment is a concrete example that shows a change in the inductance value as numerical data, and exemplifies a layout applied to a card 8 (Width: 85.60 mm, Height: 53.98 mm, Thickness: 0.76 mm) of type 1 defined in ISO/IEC 7810. As shown in FIG. 11, an electromagnetic induction coil 4 is laid out to avoid the peripheral portion of embossed regions 6 and 7 defined in ISO/IEC 7810 (in these regions, for example, the card number, cardholder name, valid dates, and the like are embossed on the surface of the substrate 1) and a magnetic stripe region 5. The two terminals of the electromagnetic induction coil 4 are connected to predetermined terminals of an IC 2. A switch 3d short-circuits the electromagnetic induction coil 4 at the position shown in FIG. 11 in the ON state. When the line width of the electromagnetic induction coil 4 is set at 0.5 mm, and the pitch at 1.0 mm, and the number of windings is two, the self-inductance is about 1 $\mu$H in the OFF state of the switch 3d.

FIG. 12A shows an equivalent circuit of the electromagnetic induction coil 4 in the OFF state of the switch 3d shown in FIG. 11. A self-inductance of inductor 10 is 1 $\mu$H. A resistance 11 represents the conductor loss of the coil. FIG. 12B shows an equivalent circuit of the electromagnetic induction coil 4 in the ON state of the switch 3d. A self-inductance of inductor 10a of the circuit shown in FIG. 12B is about 0.3 $\mu$H. This self-inductance is equal to the self-inductance of a loop extending from one terminal of the IC 2 and returning to the other terminal of the IC 2 via the switch 3d. A self-inductance of inductor 10b is about 0.29 $\mu$H. This is the self-inductance of another closed loop generated by turning on the switch 3d. A mutual inductance M between the two inductors is about 0.18 $\mu$H. Resistances 11a and 11b represent the conductor losses in the loops of the inductors 10a and 10b, respectively. These resistances typically have values of several Ohm when the coil is formed by printing, or several Ohm or less when the coil is formed by plating and etching.

The effective inductance value when the entire circuit shown in FIG. 12B from the terminals is taken into consideration depend on the values of the resistances 11a and 11b and are estimated to fall within the range of about 0.18 to 0.29 $\mu$H. That is, in the example shown in FIG. 11, the self-inductance value of the electromagnetic induction coil can be changed to ⅓ to ⅕ by turning on/off the switch. This change rate is sufficient to change the card from the normal operative state to the operation inhibited state when an induction M-type coupled circuit is used as a coupled circuit structure between the card and a read/write device, and the Q value of the circuit is designed to be relatively large.

In the above example, calculation has been done on the trial basis assuming that the number of windings of the electromagnetic induction coil 4 is two. When the design is changed to increase the number of windings, a larger inductance change can be obtained depending on the manner of selecting the short-circuit contact by the switch.

[Fifth Embodiment]

Figure 13A:
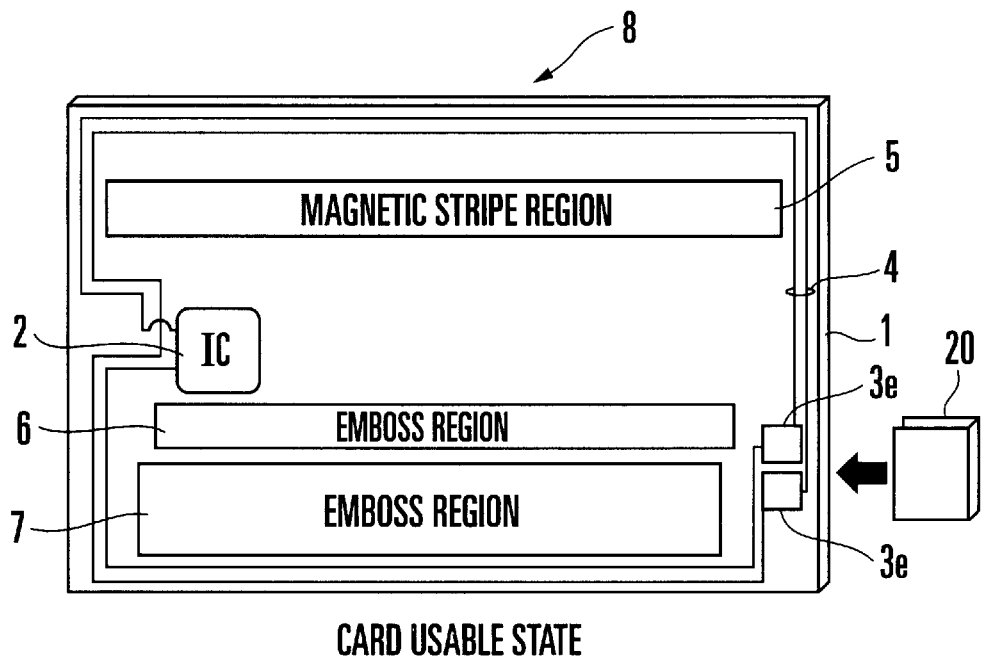
FIG. 13A is a perspective view showing the fifth embodiment of the present invention (before a clip is attached)
Figure 13B:
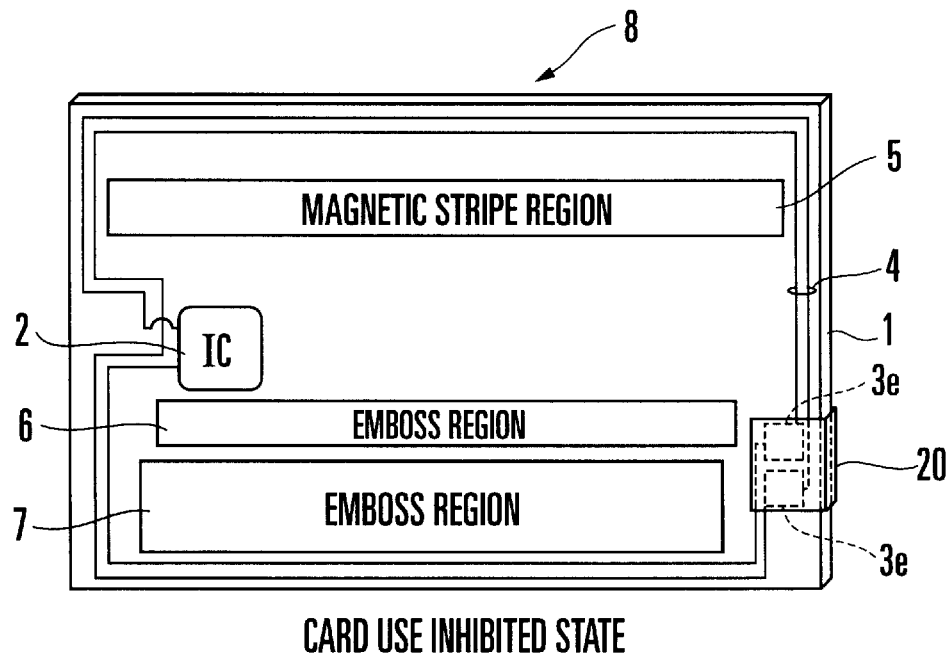
FIG. 13B is a perspective view showing the fifth embodiment of the present invention (after the clip is attached)

FIGS. 13A and 13B show the fifth embodiment of the present invention. As in the example shown in FIG. 11, an electromagnetic induction coil 4 is laid out to detour embossed regions 6 and 7 and a magnetic stripe region 5. The two terminals of the electromagnetic induction coil 4 are connected to predetermined terminals of an IC 2. The conductive portions of the electromagnetic induction coil, to which the switch is connected, are exposed to the card surface and surface-treated as electrical contacts. When this portion is clamped by a card clip 20 of a metal, the electrodes exposed to the surface of short-circuited to inhibit the card operation. The card clip 20 is thin and is brought into tight contact with the card such that other functions of the card are not impeded.

Figure 14:
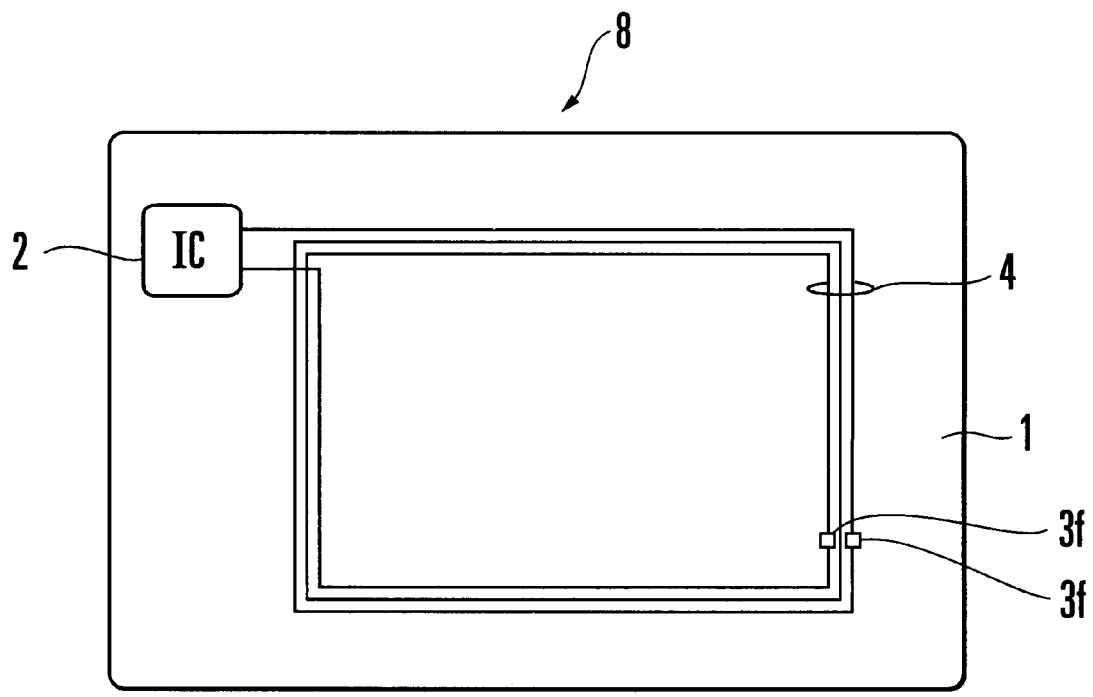
FIG. 14 is a plan view showing a modification of the fifth embodiment of the present invention.

The positions of the electrodes are not limited to the above-described portions. For example, as shown in FIG. 14, electrodes 3f may be formed while skipping one turn.

Figure 15A:
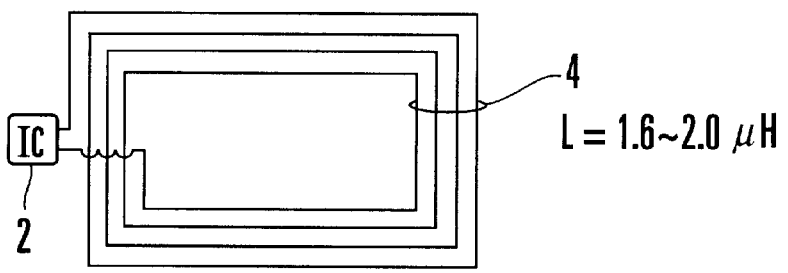
FIG. 15A is an explanatory view for explaining the inductance value without any short circuit.
Figure 15B:
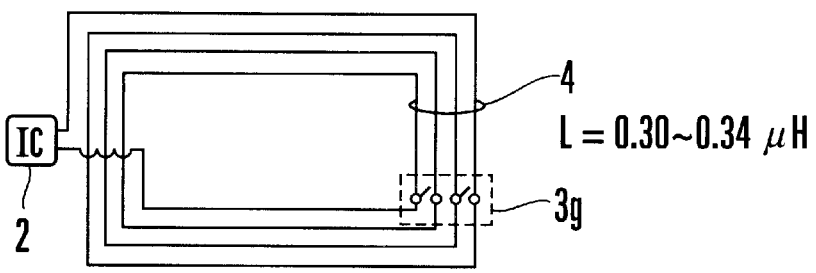
FIG. 15B is an explanatory view for explaining the inductance value when the first and second turns counted from the inside are short-circuited, and the third and fourth turns are short-circuited.
Figure 15C:
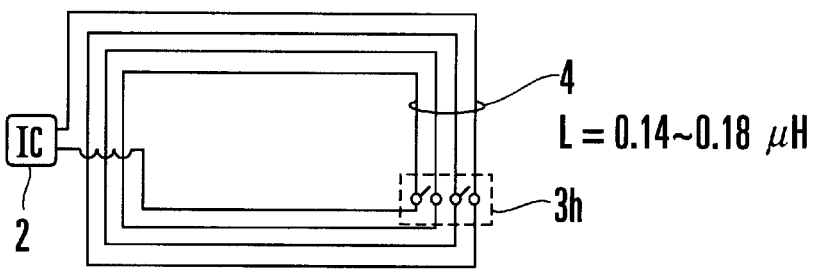
FIG. 15C is an explanatory view for explaining the inductance value when all turns are short-circuited.
Figure 15D:
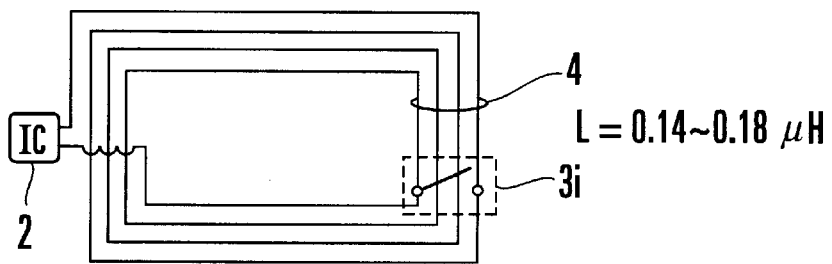
FIG. 15D is an explanatory view for explaining the inductance value when the innermost turn and outermost turn are short-circuited.

When the number of skipped turns increases, the inductance more largely varies. The number of turns to be skipped and the pair of turns to be short-circuited are determined in accordance with the necessary change amount of the inductance value. For example, when the short-circuit state is not formed by the switch, as shown in FIG. 15A, an inductance L is 1.6 to 2.0 $\mu$H. When the first and second turns counted from the inside are short-circuited, and the third and fourth turns are short-circuited, as shown in FIG. 15B, the inductance L is 0.30 to 0.34 $\mu$H. As shown in FIG. 15C, when all turns are short-circuited, the inductance L is 0.14 to 0.18 $\mu$H. This is the same result as that when the innermost and outermost turns are short-circuited, as shown in FIG. 15D.

[Sixth Embodiment]

Figure 16A:
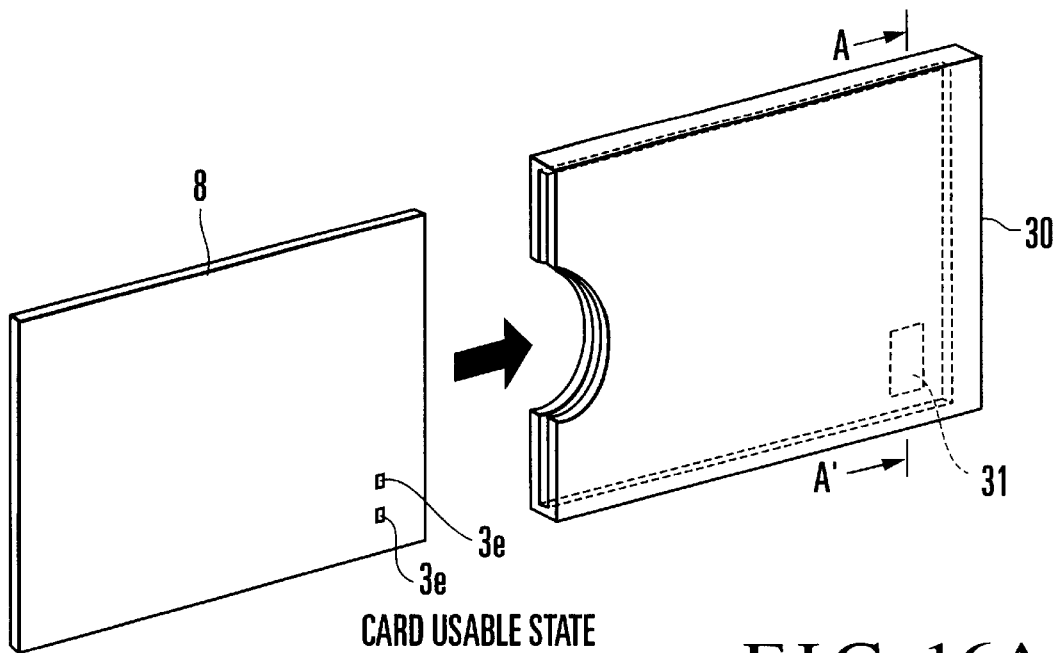
FIG. 16A is a perspective view showing the sixth embodiment of the present invention (before the card is inserted)
Figure 16B:
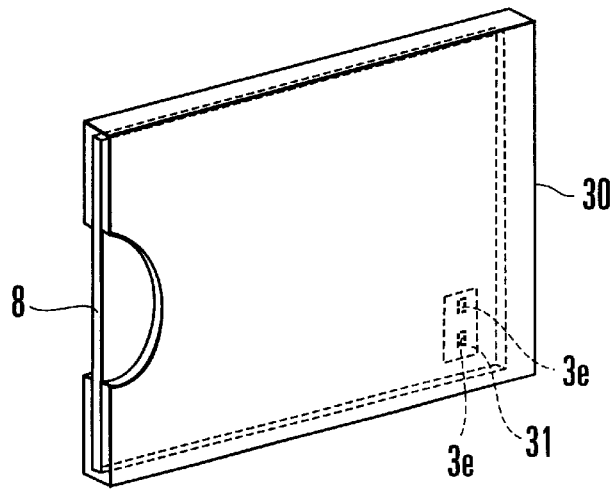
FIG. 16B is a perspective view showing the sixth embodiment of the present invention (after the card is inserted)

FIGS. 16A and 16B show the sixth embodiment of the present invention.

Figure 16C:
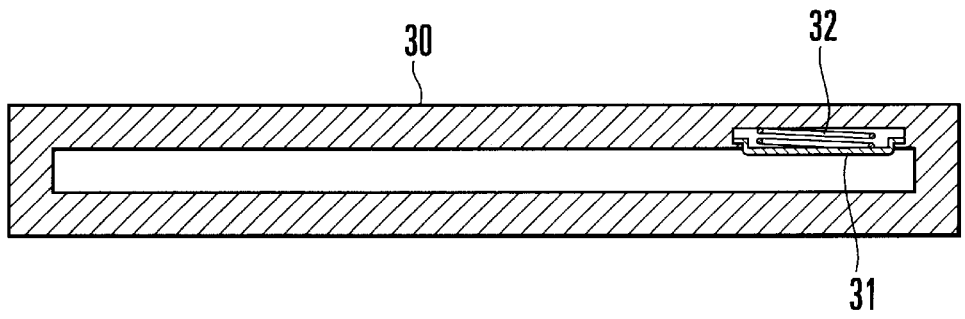
FIG. 16C is a sectional view taken along a line A–A'.

FIG. 16C shows a section taken along a line A–A' in FIG. 16A. Referring to FIGS. 13A and 13B, only the terminal portion is clamped by the card clip 20. A card folder having the same function as the above example may be used. More specifically, when an IC card 8 is inserted into a plastic card folder 30, a metal plate 31 having a spring structure 32 in the folder is pressed against electrodes 3e, and the two electrodes 3e are short-circuited. Hence, the IC card 8 does not operate and is in a use inhibited state while it is inserted into the card folder 30.

Figure 17A:
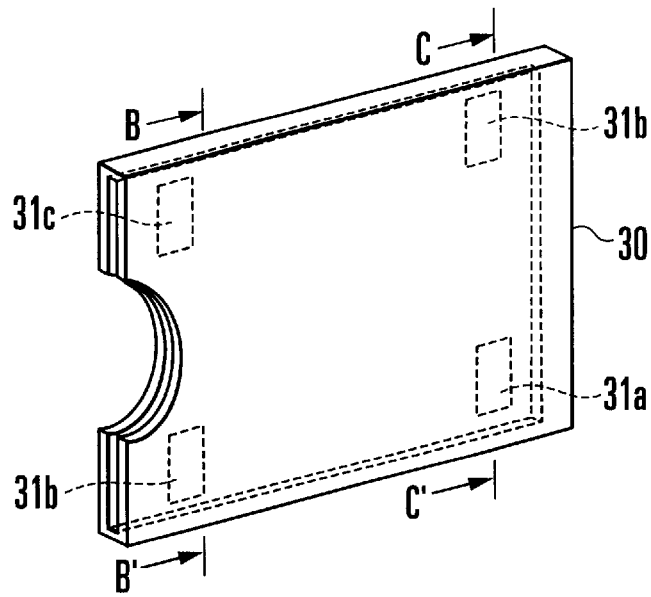
FIG. 17A is a perspective view showing a modification of the sixth embodiment.
Figure 17B:
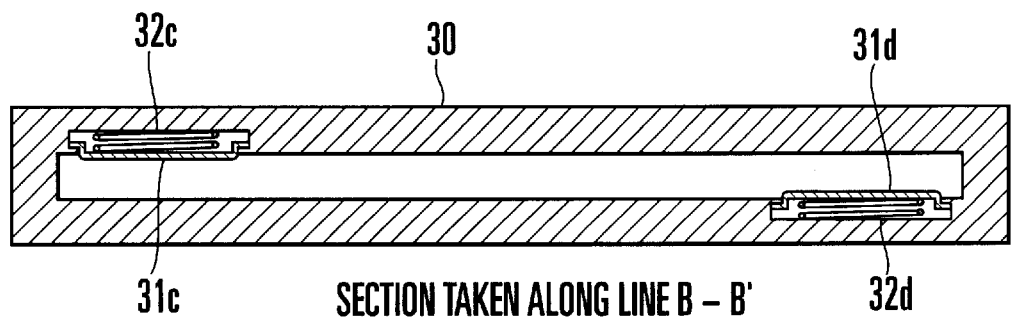
FIG. 17B is a sectional view taken along a line B–B'.
Figure 17C:
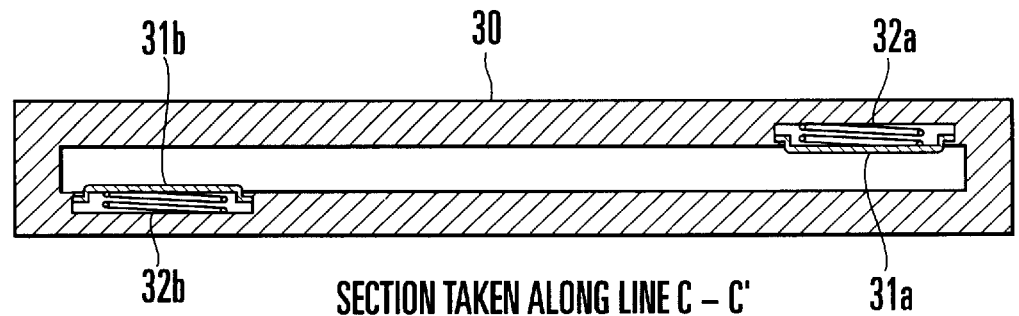
FIG. 17C is a sectional view taken along a line C–C'.
Figure 18A:
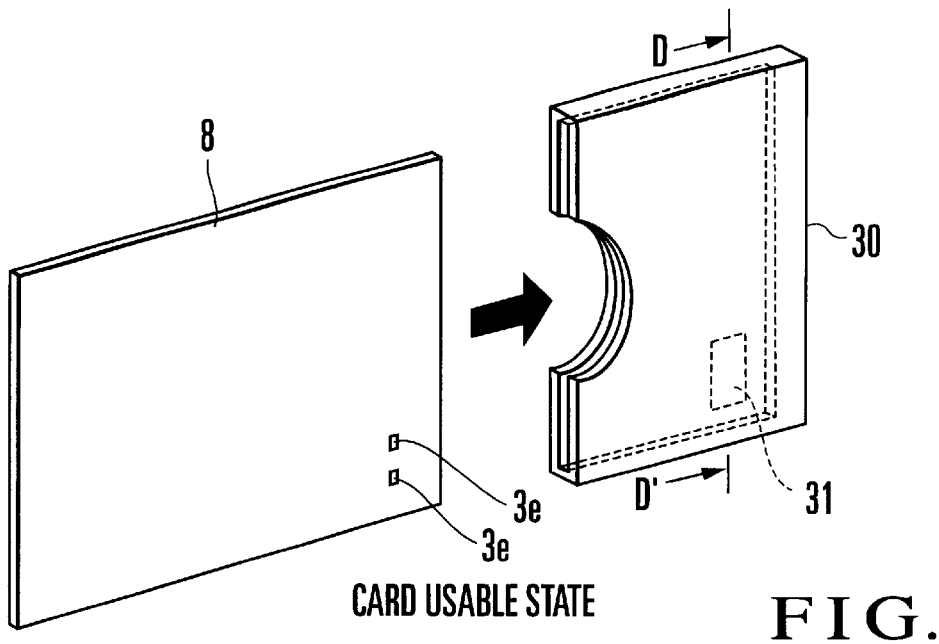
FIG. 18A is a perspective view showing a modification of the sixth embodiment (before the card is inserted)
Figure 18B:
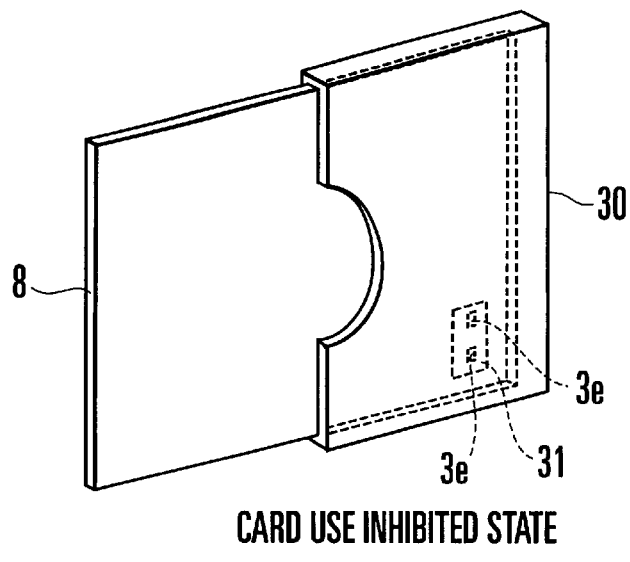
FIG. 18B is a perspective view showing a modification of the sixth embodiment (after the card is inserted)
Figure 18C:
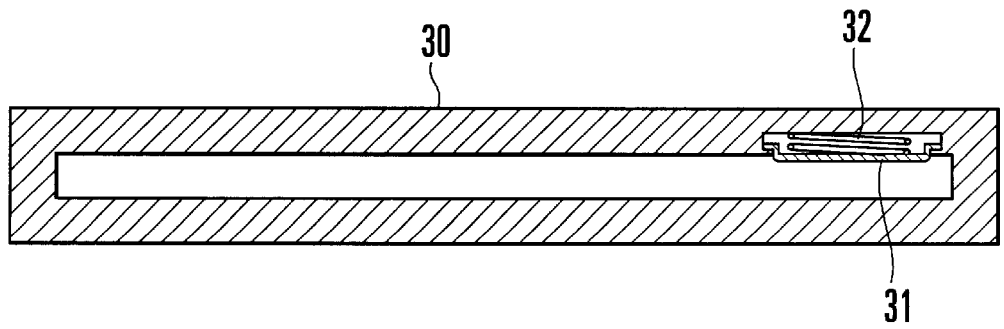
FIG. 18C is a sectional view taken along a line D–D'.
Figure 19A:
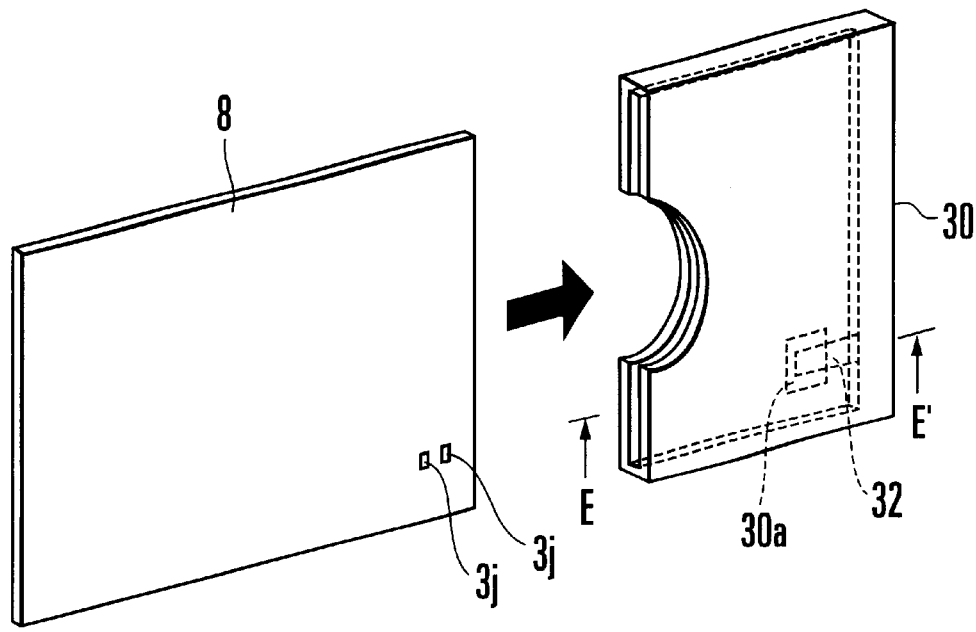
FIG. 19A is a perspective view showing another modification of the sixth embodiment.
Figure 19B:
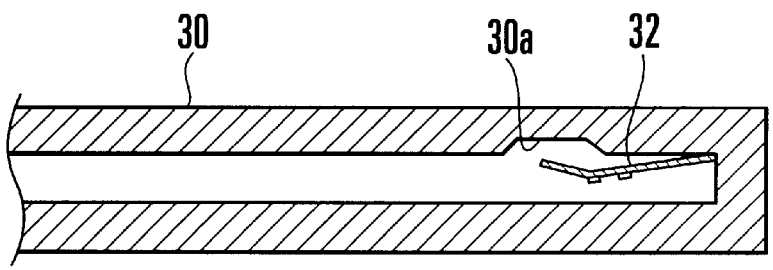
FIG. 19B is a sectional view taken along a line E–E' (before the card is inserted)
Figure 19C:
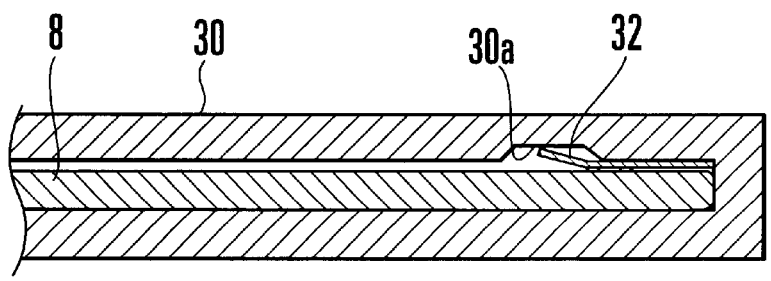
FIG. 19C is a sectional view taken along the line E–E' (after the card is inserted)

The shape of the card folder is not limited to the above-described shape. The present invention also incorporates the following modifications. For example, as shown in FIGS. 17A, 17B, and 17C, when spring structures 31a, 31b, 31c, and 31d and metal plates 32a, 32b, 32c, and 32d are prepared at four corners in the folder, the use inhibited state of the IC card 8 can be realized independently of the insertion direction and the lower/upper surface of the card. As shown in FIGS. 18A, 18B, and 18C, the size of the card folder 30 may be made smaller than that of the IC card 8. In addition, as shown in FIGS. 19A, 19B, and 19C, a leaf spring structure may be used as a structure for short-circuiting the electrodes. A leaf spring 32 is provided in the card folder 30 to short-circuit the electrodes of the inserted card. In this case, a recessed portion 30a is preferably formed such that part of the bent leaf spring 32 can retreat when the card is inserted.

Figure 20A:
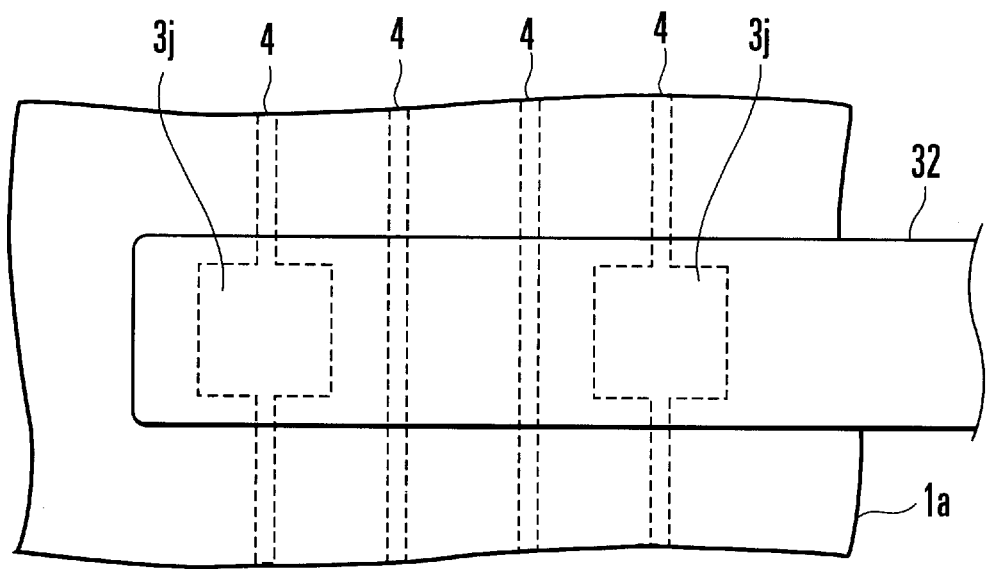
FIG. 20A is a plan view showing details of electrodes and leaf spring.
Figure 20B:
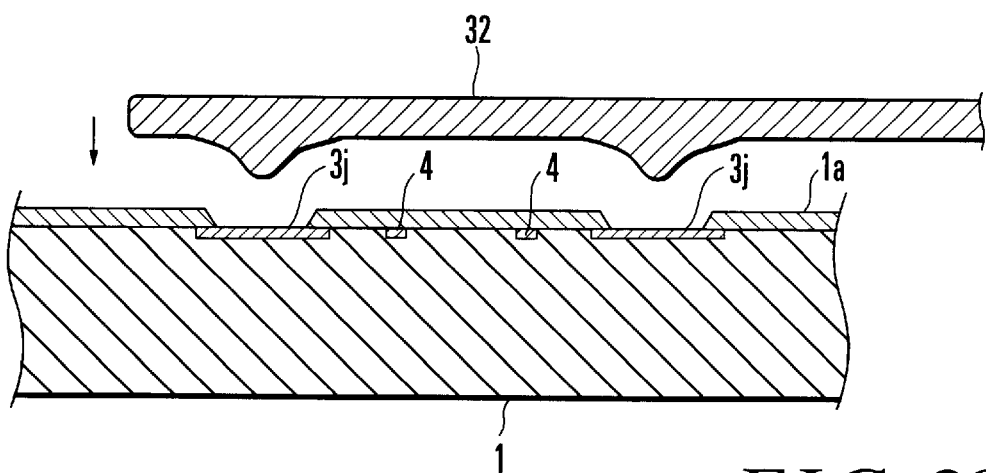
FIG. 20B is a sectional view showing details of the electrodes and leaf spring.
Figure 20C:
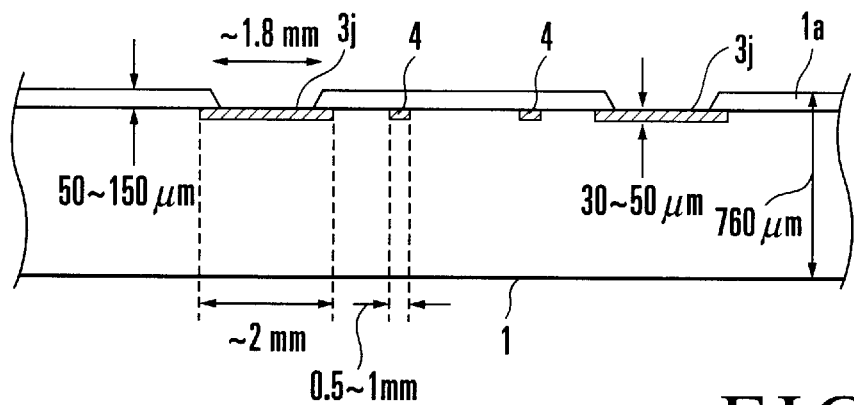
FIG. 20C is a sectional view showing the sizes of the electrodes and leaf spring.

FIGS. 20A and 20B shows details of the peripheral structure of electrodes 3j and leaf spring 32. In this example, the electrodes 3j are provided by skipping two turns. The electromagnetic induction coil 4 formed on a substrate 1 is covered with an insulating protective sheet 1a, and openings are formed to expose only the electrodes 3j. FIG. 20C shows the sizes of the respective portions. The size of each electrode 3j is 2 mm square, the width of the electromagnetic induction coil 4 is 0.5 to 1 mm, the thickness of the electrode 3j and electromagnetic induction coil 4 is 30 to 50 $\mu$m, the thickness of the protective sheet 1a is 50 to 150 $\mu$m, and the size of the opening of the electrode 3j is 1.8 $\mu$m square. The thickness of the card (including the protective sheet 1a) is 760 $\mu$m.

[Seventh Embodiment]

Figure 21:
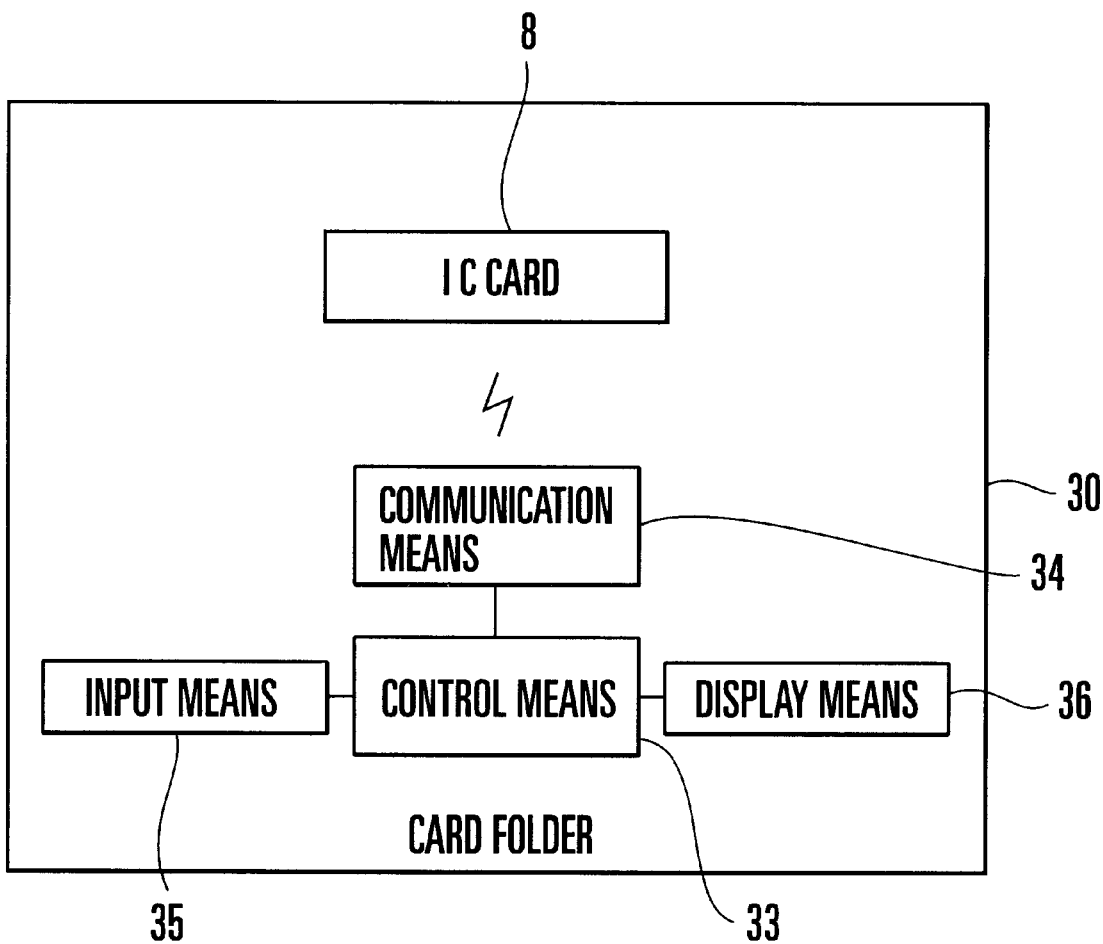
FIG. 21 is a block diagram showing the seventh embodiment of the present invention.

FIG. 21 shows the seventh embodiment of the present invention. As shown in FIG. 21, a card folder 30 of this embodiment has, in addition to the arrangement of the sixth embodiment, a control means 33 for controlling the respective sections and performing calculation, a communication means 34 for communicating with an IC card 8, an input means 35 for key input by the user, and a display means 36 for displaying various information under the control of the control means 33. The card folder 30 of the sixth embodiment is merely a container for storing the IC card 8.

However, when the card folder 30 has a calculation function, a display function, and an active function such as a communication interface, it can also be used as a PDA (Personal Digital Assistants). In this case, the card folder 30 not only inhibits communication between the IC card 8 and an external terminal (reader/writer) but also reads out information from the card or writes information in the card by communicating with the IC card 8 instead of reading out information using the external terminal.

Figures 22A, 22B, 22C:
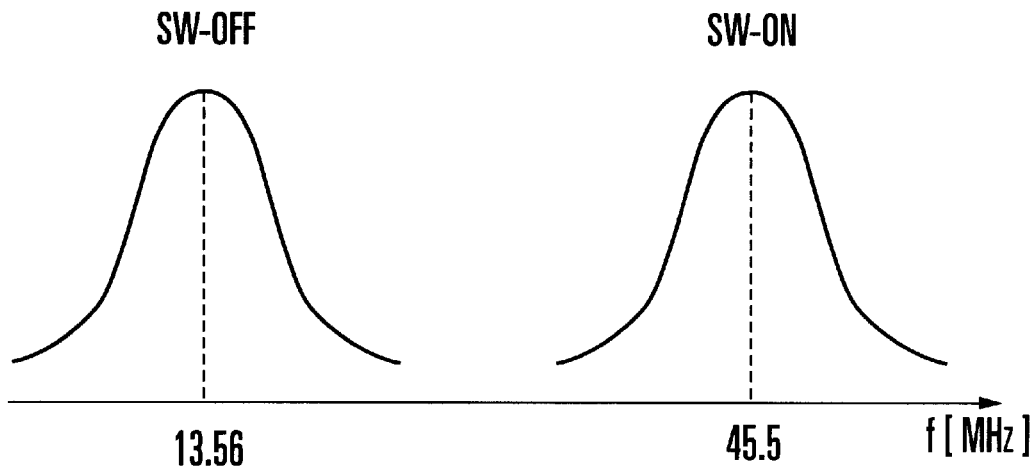
FIG. 22A is a graph for explaining the seventh embodiment of the present invention (frequency characteristics)
FIG. 22B is a table showing the seventh embodiment of the present invention (the relationship between the switch ON/OFF state, the self-inductance, and the resonance frequency)
FIG. 22C is a table showing the seventh embodiment of the present invention (the relationship between the switch ON/OFF state, the communication state between an external terminal and an IC card, and the communication state between a card folder and the IC card).

Communication with the external terminal and that with the card folder are switched in the following way. As shown in FIGS. 22A, 22B, and 22C, when the switch is turned off, the self-inductance is 1.8 $\mu$H, and the resonance frequency is 13.56 MHz. When the switch is turned on, the self-inductance is 0.16 $\mu$H, and the resonance frequency is 45.5 MHz. When the card communicates with the card folder 30 using the resonance frequency (45.5 MHz) at which communication with the external terminal is impossible, the information read/write in the card can be performed only on the card folder 30 side without communicating with the external terminal.

In the first to seventh embodiments, the IC 2 is operated by coupling an induction field (proximity field) generated by the external device. The present invention also incorporates a case wherein power is supplied by an electromagnetic wave (radiation field) radiated from the external device. In this case as well, the same effect as described above can be obtained. In addition, even when a power feed antenna and an information transmission antenna are independently prepared, and a switch is provided for one or both of them, the same effect as described above can be obtained.

As has been described above, according to the present invention, a switch for short-circuiting or disconnecting part of the conductor forming the electromagnetic induction coil or antenna as a noncontact interface of the IC card is provided to change the inductance. Even when the card is moved close to the read/write device, the operation of the card can be inhibited. Hence, any information leakage or invalid transactions due to illicitness, undesired interference between systems of different types, and operation errors can be prevented. The cardholder can properly protect the card and information held in the card. Cards having noncontact interfaces are expected to be widely used in the future. The present invention gives a very effective solution to problems that are supposed in the process of popularization.

What is claimed is:

1. A noncontact type IC card comprising:

an antenna coil to receive energy of an electromagnetic field radiated from an external device;

an integrated circuit which can be operated by driving power supplied by the energy of the electromagnetic field; and a connecting means electrically connected with an antenna conductor in a surrounding portion of the antenna coil, the actuation of the connecting means changes the inductance of the antenna coil.

2. A card according to claim 1, wherein said means for receiving the energy of the electromagnetic field comprises an electromagnetic induction coil.

3. A card according to claim 1, wherein said means for receiving the energy of the electromagnetic field comprises a strip antenna.

4. A card according to claim 1, wherein said means for receiving the energy of the electromagnetic field comprises a slot antenna.

5. A card according to claim 1, wherein said means for receiving the energy of the electromagnetic field comprises a bowtie antenna.

6. A card according to claim 1, wherein said switch is connected in series to said means for receiving the energy of the electromagnetic field.

7. A card according to claim 1, wherein said switch is connected in parallel to said means for receiving the energy of the electromagnetic field.

8. A noncontact type IC card system comprising:

a noncontact type IC card having means for receiving an energy of an electromagnetic field radiated from an external device and an integrated circuit which can be operated by driving power supplied by the energy of the electromagnetic field; and means which comes into contact with part of said means for receiving the energy of the electromagnetic field, thereby changing an inductance of said means;

wherein said means for changing the inductance comprises a card folder to receive the noncontact type IC card, the card folder short-circuiting at least two terminals provided at part of the means for receiving the energy of the electromagnetic field while receiving the noncontact type IC card.

9. A system according to claim 8, wherein said means for changing the inductance comprises a card clip formed from a conductive material, said card clip short-circuiting at least two terminals provided at part of said means for receiving the energy of the electromagnetic field while clamping said noncontact type IC card.

10. A system according to claim 8, wherein said means for changing the inductance comprises a card folder which can receive said noncontact type IC card, said card folder short-circuiting at least two terminals provided at part of said means for receiving the energy of the electromagnetic field while receiving said noncontact type IC card.

11. A system according to claim 10, wherein said card folder comprises means for communicating with said IC card.

12. A system according to claim 8, wherein said means for receiving the energy of the electromagnetic field comprises an electromagnetic induction coil.

13. A system according to claim 8, wherein said means for receiving the energy of the electromagnetic field comprises a strip antenna.

14. A system according to claim 8, wherein said means for receiving the energy of the electromagnetic field comprises a slot antenna.

15. A system according to claim 8, wherein said means for receiving the energy of the electromagnetic field comprises a bowtie antenna.

16. A system according to claim 8, wherein said means for changing the inductance is connected in series to said means for receiving the energy of the electromagnetic field.

17. A system according to claim 8, wherein said means for changing the inductance is connected in parallel to said means for receiving the energy of the electromagnetic field.

18. The noncontact type IC card of claim 1, wherein the connecting means comprises a tactile switch in the noncontact type IC card.

19. A noncontact type IC card system comprising:

a noncontact type IC card including an antenna coil to receive electromagnetic field energy radiated from an external device, an integrated circuit that can be operated by a driving power supplied by the electromagnetic field energy, and a connecting means, to change the inductance of the antenna coil, having a plurality of terminals connected to an antenna conductor, the plurality of terminals exposed on the surface of the noncontact type IC card; and a card folder having a means for changing the inductance of the antenna coil by coming into contact with the plurality of terminals.

20. The noncontact type IC card system of claim 19, wherein the means for changing the inductance of the antenna coil is a communications means for the card folder to communicate with the noncontact type IC card, the frequency used by the communications means tunes with a resonance frequency of the noncontact type IC card.

* * * * *